Jan. 30, 1968 H. W. HARTMAN 3,366,438
METHOD OF PHOTOGRAPHY AND APPARATUS TO CARRY OUT THE METHOD
Filed July 23, 1965
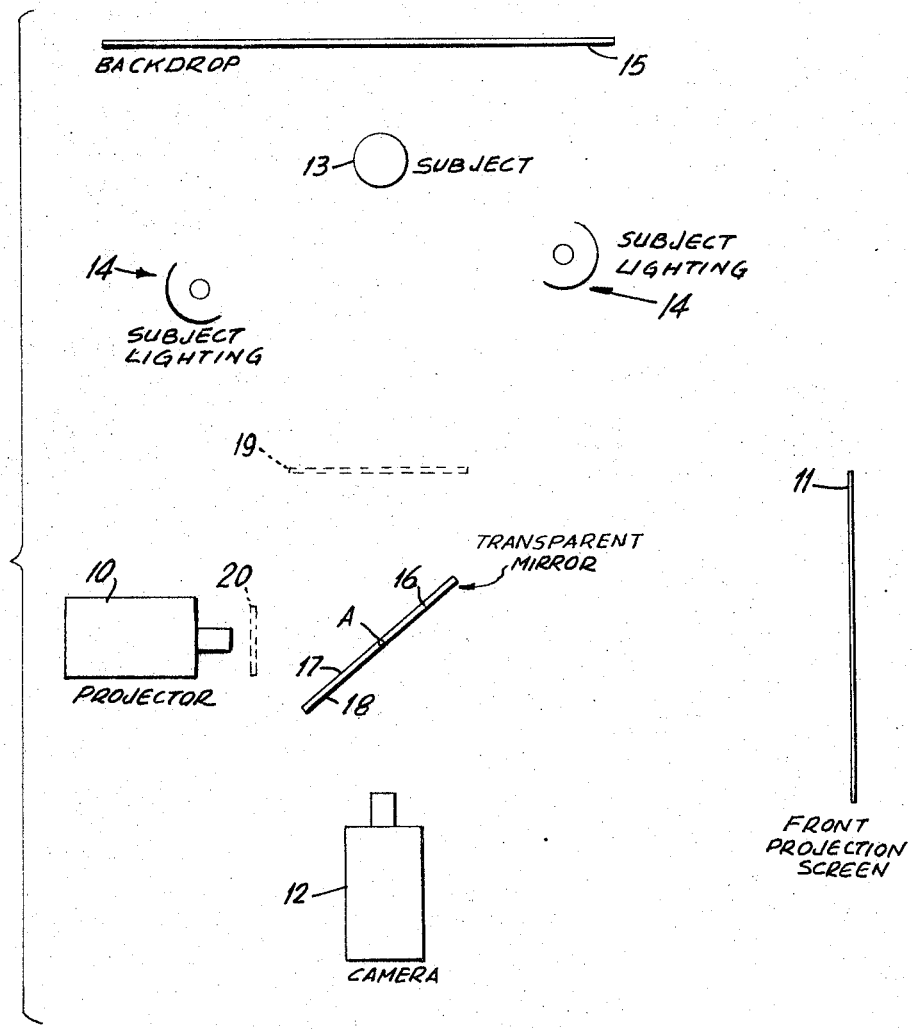
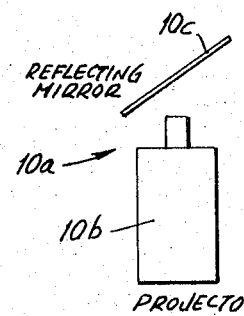
INVENTOR.
HARRY W. HARTMAN
BY
J.B. Felshin
ATTORNEY.

United States Patent Office 3,366,438
Patented Jan. 30, 1968

3,366,438
METHOD OF PHOTOGRAPHY AND APPARATUS
TO CARRY OUT THE METHOD
Harry W. Hartman, 120 E. 32nd St.,
New York, N.Y. 10016
Filed July 23, 1965, Ser. No. 474,234
14 Claims. (Cl. 352—47)

This invention relates to a method of photography and apparatus to carry out the method.

It is an object of this invention to provide a method and apparatus of the character described wherein montage effects can be produced and the effect seen in the viewfinder of the camera before the film is exposed, thereby avoiding the use of the old processes of double exposure, overlying transparencies called sandwiching, dark room manipulation such as double printing, or the like.

Another object of this invention is to provide a method and apparatus of the character described which is adaptable for use with any sort of camera such as still, motion picture or the like, to produce montage effects.

Another object of this invention is to provide a method and apparatus of the character described which will be extremely versatile to permit the user great creativity in that the user may adjust all the variables, such as distances, brightnesses, positions and the like, to compose the picture and see the product as it will appear in the camera viewfinder before taking the picture, which at the same time will be easy to use, not require expensive scenery or the like, which will operate with existing components thereby not requiring any expensive special equipment, and which will be practical and efficient to a high degree in use.

Heretofore, there existed a system of combining a subject with a projected background, but that involved placing the background behind the subject, and the subject cut off part of the screen, and that reduced the efficiency of the screen. Another difficulty with the aforesaid method was that the projector projects so lightly on the subject in relation to the image on the screen that it does not register on the photograph. Another difficulty with the above mentioned system is that the camera could only focus on either the subject or the screen, and therefore either the subject or the background was somewhat out of focus. Another difficulty with the above mentioned system is that since the subject is in front of the screen, the shadow of the subject sometimes appeared on the screen, producing an objectional dark outline around the subject in the projected image.

It was also well known in photography to provide a montage. There were three ways to do so. One was double exposure on one film, two was by putting two transparencies or negatives together known as the sandwiching method. Three, was dark room manipulation such as double printing. These old montage methods required considerable manipulation and were expensive and time consuming.

It is hence one object of the present invention to provide the effect of double exposure without having to double expose, and in which a subject and a projected background are photographed at the same time, without placing the subject in front of the screen on which the background is projected, so that no part of the screen on which the background is projected is blocked, and the full image projected on the screen is exposed to the camera lens.

Other objects of this invention will in part be obvious and in part hereinafter pointed out.

The invention accordingly consists in the steps, features of construction, combinations of elements, and arrangement of parts which will be exemplified in the construction and method hereinafter described, and of which the scope of invention will be indicated in the following claims.

In the accompanying drawing, in which is shown an illustrative embodiment of the invention:

FIG. 1 is a top plan schematic showing of one arrangement of the apparatus according to the invention; and FIG. 2 is a schematic elevational view of an alternate projector arrangement.

Referring to FIG. 1, the invention comprises a projector 10 which may be of any type, such as motion picture, slide, transparency or the like.

Aligned with projector 10 and positioned perpendicular to the beam from said projector, is a front projection or reflex type screen 11. Such screens are well known. The feature of this type of screen is that it has a very high reflective efficiency, and reflects light coaxial with the incident light. That is, the screen reflects substantially all the light striking it straight back towards the source.

A camera 12 is positioned to one side of the projector 10 and screen 11, and is pointed or aimed at right angles to the imaginary line between said projector and screen. Camera 12 may be of any type such as still, motion picture, television, or the like.

Aligned with camera 12 is a subject 13, positioned on the other side of the projector-screen line. Lights 14 may be provided to illuminate the subject 13 if desired. Preferably, a backdrop 15 of light absorbing material such as black paper may be positioned behind the subject. Depending on conditions, the lights 14 and backdrop 15, or either of them, may not be required, as will be obvious to those skilled in the art.

An imaginary line running between the camera 12 and subject 13 is at right angles to the projector-screen line, and said lines intersect at imaginary point A.

At said point A, and disposed perpendicularly to both said lines is a beam splitter, transparent mirror or semi-reflecting mirror 16. Semi-reflector 16 is of a well known type which transmits a certain percentage of the light striking it just as any transparent material would, and reflects the remainder of the incident light just as an ordinary mirror would. In the claims, member 16 will be termed a transparent mirror to designate a plane sheet which will reflect light beams and allow light beams to pass therethrough. A 60% transmissive, 40% reflective, mirror has been found satisfactory, but a mirror with any other percentages could be used depending on the conditions and effect sought to be achieved. Semi-reflector 16 is disposed as aforesaid with one surface 17 disposed facing towards projector 10 and subject 13, and the other surface 18 thereof disposed facing towards screen 11 and camera 12.

In FIG. 2 is shown a projector assembly 10a, which comprises a projector 10b and an ordinary mirror 10c, positioned above projector 10b and disposed at a 45° angle to the beam from said projector. Assembly 10a is of advantage when a vertical projector is desired for any reason. The reflected image from mirror 10c functions as the image from projector 10 functions.

To further control the result achieved, masks, which are of themselves well known, may be used. A mask 19 is shown positioned, in dashed lines, on the camera subject line between the semi-reflector 16 and the subject. Another mask 20 is shown positioned, in dashed lines, on the projector screen line between the projector and the semi-reflector. Screen 20 could also be of a type which fits directly onto or into the projector lens structure, or could be sandwiched with the slide or the like being projected. The invention may be used with either one of, both of, or without the masks 19 and 20.

The masks 19 and 20 may be made of cardboard or any other suitable material.

With the use of these masks, selective or partial montage effects can be produced. That is, the finished picture will comprise the projected image, the subject, each without montage, and the lines of meeting, which are determined by the shape of the mask or masks, will be blended or montaged.

The method of the invention can be illustrated by an example. Assume it is desired to take a still photograph of a man being consumed by flames. In such case, it would be desirable that the flames and the man appear in the finished picture to be in the same plane, that is, a montage. Therefore, the distances of the camera and the projector from point A are adjusted so that they are equal to each other, and the distances of the subject and the screen from point A are adjusted so that they are equal to each other. An existing slide or transparency of flames only is projected from projector 10 or 10b. 60% of the light from the projector is transmitted by semi-reflector 16 and reaches screen 11. 40% of the light from the projector is directed toward the subject and is lost behind the subject. The portion of the projected image which reaches the subject is so faint in comparison with the subject that it is not detected by the camera.

The subject 13, in this example, is an actor showing the emotion and expression desired for the finished picture. The lights 14 illuminate the actor as desired, with any excess light being absorbed by backdrop 15.

The photographer focuses the camera at the distance from the camera to the actor, which is the same, in this example, as the distance from the camera to point A to the screen. The camera is preferably provided with a ground glass viewfinder, and by adjusting the intensity of the light source in the projector and/or the lights 14, the photographer can get the conditions exactly right to get the desired effect before exposing the film. As can readily be seen, by moving any one or any combination of the projector, camera, subject or screen closer to or farther from point A, any relationship of sharpness of focus, and any relationship between the planes of the projected image and the subject, can be achieved.

Other variations will appear to those skilled in the art, such as the use of special and/or colored filters in the camera and/or the projector, and the like, and it is intended to cover such variations within the scope of the following claims.

It will thus be seen that there is provided a method and apparatus in which the several objects of this invention are achieved, and which is well adapted to meet the conditions of practical use.

As possible embodiments might be made of the above invention, and as various changes might be made in the embodiment set forth above, it is to be understood that all matter herein set forth and shown in the accompanying drawings, is to be interpreted as illustrative and not in a limiting sense.

I claim:

1. In combination, a projection means, a screen housing the projection axis of said projection means to receive a projected image therefrom, a camera, a subject aligned with said camera, the line between said camera and subject intersecting said axis of said projection means, a transparent mirror at said intersection of said line and axis and bisecting the angle therebetween, said transparent mirror having one surface facing towards said subject and said projection means at an inclination thereto, and the other surface facing towards said camera and said screen at an inclination thereto.

2. The combination of claim 1, said axis and line being at right angles to one another, whereby said transparent mirror is disposed at forty-five degrees to both said axis and line.

3. The combination of claim 1, and means to illuminate said subject.

4. The combination of claim 1, the distance from the lens of the camera to said transparent mirror along said line being substantially equal to the distance from said projection means to said transparent mirror along said axis, and the distance from the lens of the camera to the subject along said line being equal to the distance from the projection means to said screen along said axis.

5. The combination of claim 1, and a black backdrop disposed behind said subject.

6. The combination of claim 1, said projection means comprising a projector having an optical axis at right angles to said projection axis, and a reflecting mirror to reflect a projected image from said optical axis to said projection axis.

7. The combination of claim 1, in which said projector axis and said line both extend horizontally.

8. The combination of claim 2, means to illuminate said subject, the distance from the lens of the camera to said transparent mirror along said line being substantially equal to the distance from said projection means to said transparent mirror along said axis, and the distance from the lens of the camera to the subject along said line being equal to the distance from the projection means to said screen along said axis.

9. The combination of claim 8, and a dark backdrop disposed behind said subject.

10. A method of photography comprising the steps of projecting an image on a screen through a transparent mirror positioned at substantially a forty-five degree angle to the beam from the projector, and simultaneously photographing a subject through said transparent mirror, whereby to obtain a photograph of said subject and said image.

11. The combination of claim 10, lighting said subject.

12. The combination of claim 11, and causing the projected image which by-passes the subject to be absorbed.

13. The combination of claim 1, and a mask located on said camera and subject line positioned between said subject and said transparent mirror.

14. The combination of claim 1, and a mask located on said projection axis positioned between said projector and said transparent mirror.

References Cited

UNITED STATES PATENTS

| | | | |
|---|---|---|---|
| 2,334,962 | 11/1943 | Seitz | 352—47 |
| 2,501,958 | 3/1950 | O'Brien | 352—47 |
| 2,727,427 | 12/1955 | Jenkins | 352—89 |
| 2,857,806 | 10/1958 | Shuftan | 352—89 |

JULIA E. COINER, *Primary Examiner.*